Nov. 17, 1953   M. WATTER   2,659,622
SHOCK AND SOUND ABSORBING VEHICLE WHEEL AND THE LIKE
Filed June 10, 1950
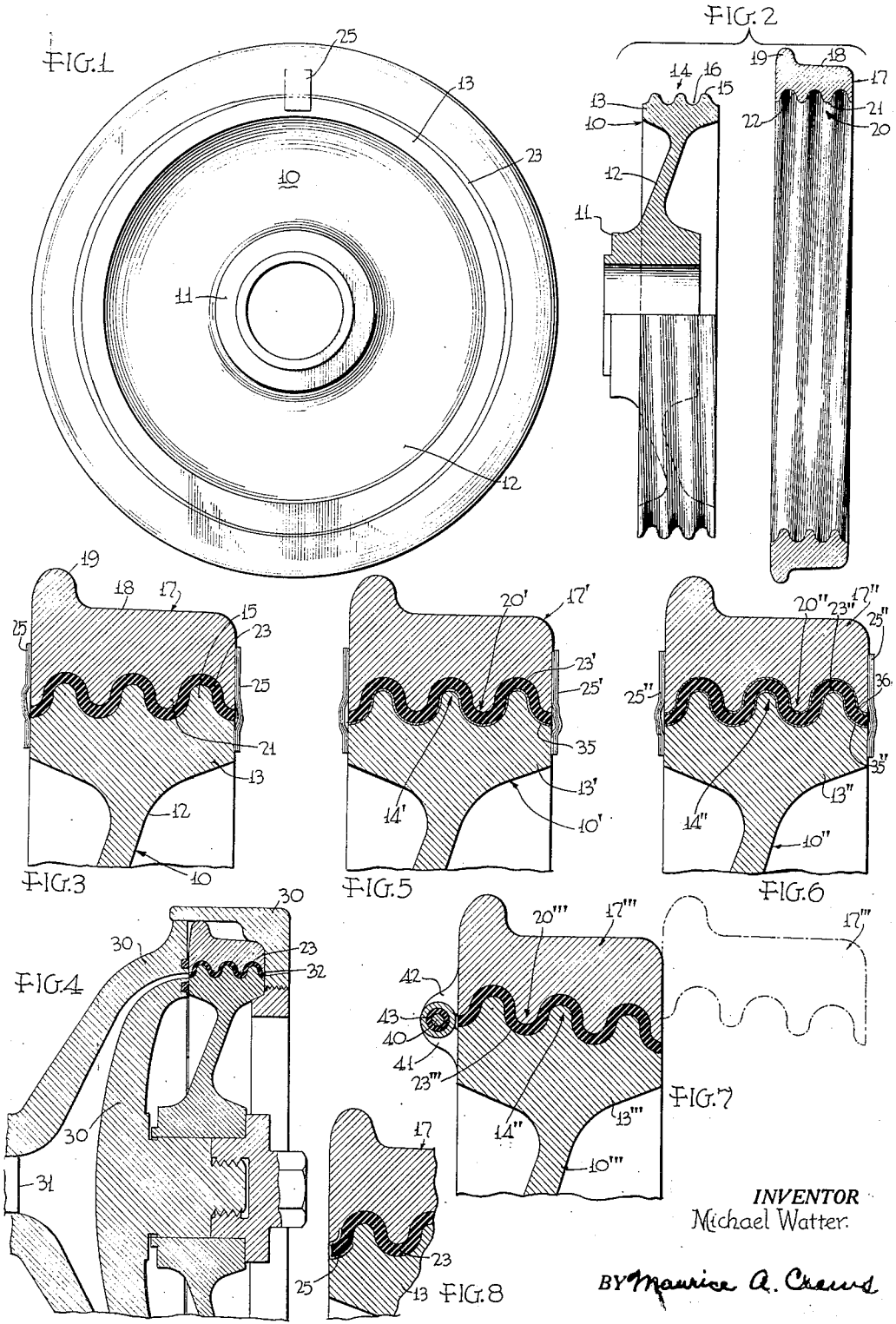
INVENTOR
Michael Watter.
BY Maurice A. Crews
ATTORNEY Patented Nov. 17, 1953

2,659,622

UNITED STATES PATENT OFFICE 2,659,622

SHOCK AND SOUND ABSORBING VEHICLE WHEEL AND THE LIKE

Michael Watter, Philadelphia, Pa., assignor to The Budd Company, Philadelphia, Pa., a corporation of Pennsylvania Application June 10, 1950, Serial No. 167,389

2 Claims. (Cl. 295—11)

This invention relates to shock and sound absorbing vehicle wheels and the like, particularly to railway wheels, and has for an object the provision of improvements in this art.

Vehicle wheels and the like which are principally subjected to radial loads on one side and which are also subjected to vibrations of great magnitude present serious problems in the elimination of transmitted vibrations and noise. This is especially true of hard surfaced wheels which run on hard surfaced ways. Railway wheels, for example, with which the present invention is primarily concerned, have metal rims which run on metal rails and the sudden vibrations and sharp noises which are transmitted into the car when the wheels pass over joints and the like have long been a source of great annoyance. Much effort has been spent in attempts to alleviate this trouble but the wheels are so heavily loaded that rubber layers and the like which have been used are a constant source of trouble. They take a permanent set upon standing for a length of time and in regular use are subject to having the rubber squeezed out of place. If parts are bolted together to retain the shock absorbing material the constant heavy vibrations tend quickly to loosen the fastenings. Moreover, the radial loading on one side is so concentrated that common rectangular rubber sections do not have the ability to withstand the stresses without prohibitive side deflection.

One of the particular objects of the present invention is to provide a wheel with effective cushioning and sound insulating material between the rim and the wheel body to avoid the transmission of undue noise and vibration from the rim to the wheel body, axle and supporting frame.

Another object is to provide a wheel having an improved construction for cooperating with the resilient material in the most effective manner to utilize the best load absorbing characteristics of the resilient material and to provide the maximum distribution of load and the greatest possible insurance against the separation or dislocation of parts during use.

Another object is to provide an assembly which requires no bolting, welding or the like during fabrication.

Another object is to provide a construction in which the resilient material, such as rubber, is so disposed and confined as to take best advantage of its conjoint shear and compression characteristics in use and which cannot creep or squeeze out.

Another object is to provide an economically desirable and easily fabricated construction.

The above and other objects and certain advantages of the invention will be apparent from the following description of an exemplary embodiment, reference being made to the accompanying drawings, wherein:

Fig. 1 is an axial end elevation of a railway wheel embodying the invention;

Fig. 2 is an exploded axial section and elevation of the wheel and rim parts before assembly;

Fig. 3 is a partial axial section of a completed assembly;

Fig. 4 is an axial section through the wheel assembly and a press assembly for forcing rubber or the like under high pressure into the space between the wheel and rim;

Fig. 5 is a section similar to Fig. 3 but showing rubber vulcanized to the rim and to a metal liner on the interior side to facilitate screwing therein of the wheel periphery;

Fig. 6 is a section similar to Fig. 3 but showing a vulcanized rubber sandwich with a thin metal liner on each side which may be screwed into the space between rim and wheel periphery;

Fig. 7 is a section similar to Fig. 3 but showing a tapered construction in which the rim may be screwed directly upon the rubber, contact being established only in the final stage and the assembly being secured against unscrewing by a lug and bolt connection with resilient cushion material therebetween; and Fig. 8 is a small detail section of a modified grounding connection.

Referring first to Figs. 1 to 4, the wheel assembly comprises a wheel proper, designated as 10, and including a hub 11, disk 12, and periphery or felly 13 provided on its outer surface with a coarse spiral rib-groove formation or thread 14 having broad round-ended ribs 15 and round bottomed grooves 16. The wheel assembly also includes a rim 17 comprising a thread surface 18, a flange 19 and a spiral thread formation 20 mating with the thread 14 on the wheel. The thread 20 comprises ribs 21 and grooves 22. The shape in cross section of the threads resembles a sine curve, the corrugations being smooth and without sharp edges. On each part there are a number of ribs and grooves, three being shown. The assembly further comprises a relatively thin layer 23 of resilient elastic material such as rubber or the like, preferably introduced under very high compression, and vulcanized and firmly bonded to both wheel and rim. The material completely fills the space between parts, leaving no voids.

It will be noted that the crowns of the ribs of wheel and rim overlap radially but stand spaced apart axially and also stand radially spaced apart from the bottoms of the opposed grooves so that a continuous space is left between threads to receive the rubber filler 23. Because of the overlap of a plurality of corrugations the rubber is confined against creep or outflow, there being no clear space parallel to the axis along which it can flow. The rubber is fairly hard, in one construction having a durometer reading of about 40, so it will resist easy flow.

In order to provide greater axial inclination, multiple threads are preferably employed, double threads being shown herein. The provision of a plurality of threads or corrugations also provides a large effective area of contact and better distribution of compression and shear loading with a small radial depth of material. This provides a wheel which has only an extremely small deflection under heavy loading, a very desirable characteristic, especially in railway wheels.

Flexible grounding conductors 25, as of woven copper webbing, are secured to rim and wheel across the rubber insulated gap, the securement being by bolting, welding, brazing or other suitable means, as is well known in the art.

In manufacture, the rim and wheel are first screwed together. The assembly is then placed in a mold, generally designated as 30 in Fig. 4, and rubber is forced in by a piston 31 under very great pressure. The rim and wheel surfaces will have first been specially treated, coated, metalized or otherwise prepared to produce a very strong rubber-to-metal surface bond, as is known in the rubber working art. A space 32 is left for the release of air and outflow of excess rubber so that assurance is provided that the space between rim and wheel is completely filled with rubber under high pre-compression.

Instead of being secured exteriorly, as shown in Figs. 1 and 3, 5 and 6, the flexible grounding conductors 25 may be attached inside the open ends of the threads and the loop then embedded in the rubber when it is forced in, as shown in Fig. 8.

In Fig. 5 the rubber layer 23' is bonded to the threads 20' of the rim 17' and has bonded to its outer surface a thin metal liner 35 which provides a good slip surface on which the wheel felly 13' is threaded.

In Fig. 6 the rubber layer 23'' is bonded on both surfaces to metal liners 35'' and 36 to form a sandwich which is secured between the threads 14'' of the wheel felly 13'' and the threads 20'' of the rim 17''.

In Fig. 7 the threads 20''' of the rim 17''' and the threads 14''' of the felly 13''' are inclined axially and radially and the rim may be screwed on the rubber without binding on it until practically fully in final position. Further turning will highly compress the rubber. It may be held in final pre-compression by a bolt 40 between circumferentially spaced lugs 41, 42 on wheel and rim respectively, the bolt being sleeved and washered fully all around by a layer of rubber 43 to provide cushioning and sound deadening.

Preferably the constructions of Figs. 5 and 6 are similarly bolted together to positively prevent separation of rim and wheel. It may also be used with the construction of Figs. 1 to 3 although this would be only for safety in case of complete rubber disintegration in that form.

Such rubber disintegration by reason of heat is minimized by using an off-wheel brake, not shown, and anti-wheel-slip means to avoid heating the rim by either brake shoe or track slippage.

By reason of the provision of radially overlapping ribs on rim and wheel, the rubber layer is placed in shear and compression and by reason of the bond at both surfaces the rubber at the top of the wheel, when the wheel is supporting the weight of a vehicle, is placed in tension and shear while the bottom is in compression and shear. Also because of the inclination of the spiral threads to axial planes there is a strong component of compressive force between ribs on the rubber on one side when torque is applied between wheel and rim in either direction, as for example when the brakes are applied and in the case of a driven wheel when the turning force is applied. Also there will be tension on the other side of the ribs when the rubber is bonded to the metal on both of its surfaces. Moreover, any unscrewing action at the threads is resisted by shear in the rubber, this also being accentuated on the compression side due to the spiral formation and being more greatly accentuated on both sides when the rubber is bonded on both surfaces to metal. The broad rounded surfaces of ribs and grooves without sharp edges aid in obtaining the tension and compression action and the shear compression action without cutting the rubber. Besides taking the heavy radial load and distributing it in the rubber in shear and compression in the manner described, the construction is also well adapted to take the very heavy axial loads to which flanged railway wheels especially are subjected, the radial overlap of a plurality of ribs and the smooth sinuous shape being well suited for this purpose. There is a good balance between shear and compressive stresses.

As an example of a wheel assembly which has been built according to the present invention, the wheel had a diameter at the tread surface of 36", a wheel body diameter to the tips or crests of the screw ribs of 31.875", a radial rubber thickness over the wheel body ribs of .3125", a thread depth from groove bottom to rib tip of .875", a radial dimension between groove bottoms of the wheel body and groove bottoms of rim of about 1.1875", a radial overlap of ribs of .5625", a rib radius at the end or crest of .3125", a groove bottom radius of .625", a rim thickness from thread surface at the center line to the tip of the thread ribs of about 3", a rim width of about 5.5", three thread ribs and grooves on each part, i. e., about .9375" from the bottom of a groove to the tip of a rib, and rubber cured after pressure injection to about 40 durometer. This wheel when subjected to a load of 20,000 lbs. on top gave a deflection on one side between rim and wheel body of only .007" in the direction of the load.

It is thus seen that the invention provides a simple, effective and relatively inexpensive wheel assembly with resilient vibration and sound-deadening insulation; also an assembly which is easily put together without bolts which are liable to work out or be cut off in shear whereby to let the metal parts separate. Preferably, the only bolts which are used at all herein are placed circumferentially where they will be in tension only.

While certain embodiments have been illustrated and described by way of example, it is to

What is claimed is:

1. A wheel assembly or the like adapted to be loaded mainly radially on one side, comprising a body portion and a rim portion provided with a tread which around its full circumference has progressive rolling compressive engagement with a cooperating element such as a track or the like, said body and rim portions having loose screw-threaded assembly association with each other with a plurality of ribs and grooves each leaving a continuous space between them which radially over rib ends is of less depth than the depth of the threads, and a filler for said space comprising at least one thin metal liner closely fitting the threads of one of said portions and a main body of vulcanized rubber bonded thereto and to an adjacent surface at its other side and held under compression between the body and rim portions.

2. A wheel assembly or the like adapted to be loaded mainly radially on one side, comprising a body portion and a rim portion provided with a tread which around its full circumference has progressive rolling compressive engagement with a cooperating element such as a track or the like, said body and rim portions having loose screw-threaded assembly association with each other with a plurality of ribs and grooves each leaving a continuous space between them which radially over rib ends is of substantial depth but less than the depth of the threads, and a filler for said space comprising thin sheet metal liners closely fitting the threads of the respective portions and a main body of vulcanized rubber bonded to each of said sheet metal liners.

MICHAEL WATTER.

References Cited in the file of this patent

UNITED STATES PATENTS

| Number | Name | Date |
|---|---|---|
| 294,750 | Atwood | Mar. 11, 1884 |
| 623,883 | Cameron | Apr. 25, 1899 |
| 1,785,812 | Gribben | Dec. 23, 1930 |
| 1,948,304 | Maas | Feb. 20, 1934 |
| 2,126,708 | Schmidt | Aug. 16, 1938 |
| 2,231,037 | Taylor | Feb. 11, 1941 |

OTHER REFERENCES

Marks, Mechanical Engineer's Handbook, second edition, 1924 (see page 702).